(12) United States Patent
Agrawal et al.

(10) Patent No.: US 11,588,376 B2
(45) Date of Patent: Feb. 21, 2023

(54) ADAPTOR WITH IMPROVED AIRFLOW

(71) Applicant: Cummins Generator Technologies Limited, Peterborough (GB)

(72) Inventors: Himanshu Agrawal, Mandla (IN); Abhishek Kakade, Pune (IN); Mark Jason Riley, Deeping St. James (GB); Robert Mitchell Rolston, Market Overton (GB); Haider Ali Abbas, Watford (GB)

(73) Assignee: Cummins Generator Technologies Limited, Peterborough (GB)

( * ) Notice: Subject to any disclaimer, the term of this patent is extended or adjusted under 35 U.S.C. 154(b) by 0 days.

(21) Appl. No.: 17/500,123

(22) Filed: Oct. 13, 2021

(65) Prior Publication Data

US 2022/0037957 A1 Feb. 3, 2022

Related U.S. Application Data

(62) Division of application No. 16/085,292, filed as application No. PCT/GB2017/050635 on Mar. 9, 2017, now abandoned.

(30) Foreign Application Priority Data

Mar. 18, 2016 (GB) ...................... 1604667

(51) Int. Cl.
*H02K 9/04* (2006.01)
*H02K 7/18* (2006.01)
(Continued)

(52) U.S. Cl.
CPC ............... *H02K 9/04* (2013.01); *F01D 15/10* (2013.01); *F04D 29/4246* (2013.01);
(Continued)

(58) Field of Classification Search
CPC . F01D 15/10; H02K 9/00; H02K 9/02; H02K 9/04; H02K 9/06; H02K 7/1815;
(Continued)

(56) References Cited

U.S. PATENT DOCUMENTS 2,500,971 A * 3/1950 Wieseman ............... H02K 9/06
310/58
2,735,030 A 2/1956 Brainard
(Continued)

FOREIGN PATENT DOCUMENTS

CN 1249028 A 3/2000
CN 201003512 Y 1/2008
(Continued)

OTHER PUBLICATIONS

English machine translation of CN-104358695-A, Jun. 15, 2022.*
(Continued)

*Primary Examiner* — Christopher Verdier
(74) *Attorney, Agent, or Firm* — Foley & Lardner LLP (57) ABSTRACT

An adaptor is disclosed for connecting a rotating electrical machine 12 to a prime mover 10. The adaptor comprises at least one air outlet. The adaptor is arranged to provide an increase in a cross-sectional area of air flow towards the outlet. In this way part of the dynamic pressure can be converted into additional static pressure rise through steady expansion of the air flow cross-section. This in turn may help to improve the overall amount of cooling air passing through the machine for a given fan input power.

20 Claims, 10 Drawing Sheets

(51) Int. Cl.

| | | |
|---|---|---|
| *H02K 9/06* | (2006.01) | |
| *H02K 15/14* | (2006.01) | |
| *H02K 5/20* | (2006.01) | |
| *F04D 29/54* | (2006.01) | |
| *F04D 29/70* | (2006.01) | |
| *F04D 29/44* | (2006.01) | |
| *F04D 29/42* | (2006.01) | |
| *F01D 15/10* | (2006.01) | |

(52) U.S. Cl.
CPC .......... *F04D 29/441* (2013.01); *F04D 29/541* (2013.01); *F04D 29/703* (2013.01); *H02K 5/20* (2013.01); *H02K 5/207* (2021.01); *H02K 7/1815* (2013.01); *H02K 9/06* (2013.01); *H02K 15/14* (2013.01)

(58) Field of Classification Search
CPC .......... H02K 15/14; H02K 5/20; H02K 5/207; F04D 29/4246; F04D 29/441; F04D 29/541; F04D 29/703
See application file for complete search history.

(56) References Cited

U.S. PATENT DOCUMENTS

| | | | |
|---|---|---|---|
| 6,271,608 | B1 | 8/2001 | Haydock et al. |
| 6,351,046 | B1 | 2/2002 | Bradfield |
| 2009/0229544 | A1 | 9/2009 | Hatsugai et al. |
| 2009/0289513 | A1 | 11/2009 | Vadillo et al. |
| 2014/0103756 | A1* | 4/2014 | Grillenberger ........... H02K 9/04 310/216.118 |
| 2014/0117797 | A1* | 5/2014 | Grillenberger ........... H02K 9/19 310/59 |
| 2014/0346780 | A1 | 11/2014 | Holder |
| 2016/0020665 | A1 | 1/2016 | Vohlgemuth |
| 2017/0175747 | A1* | 6/2017 | Gundel ................. F04D 29/282 |
| 2018/0205286 | A1 | 7/2018 | Barekar et al. |

FOREIGN PATENT DOCUMENTS

| | | | | |
|---|---|---|---|---|
| CN | 102536852 | A | | 7/2012 |
| CN | 104358695 | A * | 2/2015 | ......... F04D 29/4246 |
| CN | 204200628 | U | | 3/2015 |
| CN | 104533833 | A | | 4/2015 |
| DE | 3432503 | A1 * | 3/1986 | .......... F04D 29/441 |
| FR | 2842367 | | | 1/2004 |
| FR | 2930381 | A1 | | 10/2009 |
| JP | H66956 | | | 1/1994 |
| KR | 20-0188578 | Y1 * | 7/2000 | .......... F04D 29/624 |
| KR | 20090039160 | A | | 4/2009 |

OTHER PUBLICATIONS

International Search Report and Written Opinion for International Application No. PCT/GB2017/050635, 12 pages, dated May 23, 2017.

Office Action issued in Chinese Patent Application No. 201780015834.1 dated Dec. 7, 2020, with English translation, 24 pages.

Office Action issued in European Patent Application No. 17711275.2 dated Nov. 16, 2020, 6 pages.

Search Report for GB Application No. 1604667.4, dated Aug. 22, 2016, 3 pages.

* cited by examiner

ADAPTOR WITH IMPROVED AIRFLOW

CROSS-REFERENCE TO RELATED APPLICATIONS

This application is divisional of U.S. patent application Ser. No. 16/085,292, filed Sep. 14, 2018 as a U.S. National Stage Entry of International Application No. PCT/GB2017/050635, filed Mar. 9, 2017, which claims priority to GB Application No. 1604667.4, filed Mar. 18, 2016, the contents of which are hereby incorporated by reference in their entirety.

The present invention relates to an adaptor for connecting a rotating electrical machine to a prime mover, and in particular an adaptor which is designed to improve airflow through the machine.

Power generation systems typically comprise a prime mover connected to a rotating electrical machine. For example, a generating set may comprise an internal combustion engine, such as a diesel engine, coupled to a generator (alternator). In operation the prime mover is used to drive the generator, in order to generate the output power. This is achieved by mechanically connecting rotating parts of the prime mover and the generator. An adaptor may be used to connect non-rotating parts, in order to prevent movement between the prime mover and the generator.

Rotating electrical machines generally comprise a rotor which is caused to rotate relative to a stator. The stator itself may be held within a stator frame. Typically, a magnetic field produced by the rotor interacts with windings in the stator to produce an electrical output. The rotor's magnetic field may be produced by rotor windings or permanent magnets.

In operation, currents passing through the stator and/or rotor windings, as well as other factors such as friction and windage losses, may cause the machine to heat up. Therefore many machines, particularly those of a larger design, require some form of cooling. This may be achieved by providing a fan which forces air flow through the machine. The fan may be mounted on the rotor shaft, and may be driven directly by the prime mover. Alternatively, an independently-driven fan may be provided. The fan may either push or pull air through the machine. Air flow through the machine is usually in a generally axial direction. The main paths for the air flow are usually through the rotor/stator airgap, and through an airgap between the stator core and the stator frame.

In existing adaptor designs, the fan may be mounted on the machine shaft inside the adaptor. Air outlets may be provided in the adaptor in order to provide an exit path for airflow through the machine. The air outlets may also provide access for an operator to connect rotating parts of the prime mover and the electrical machine during assembly.

An example of a known adaptor is disclosed in US 2014/0346780, the subject matter of which is incorporated herein by reference.

In a previously considered adaptor design, air outlets are provided at the side of the adaptor. For example, a "square-shaped" adaptor design may be used, with two air outlets on each side of the adaptor. A square shaped adaptor design may provide various advantages, such as structural rigidity, ingress protection, and allowing the expelled air to be directed in a sideways direction away from other parts of the generating set.

However it has been found that square-shaped designs and/or designs with side outlets may have a less than ideal aerodynamic performance, leading to a reduction in the overall amount of cooling air passing through the machine, and an increase in the fan input power. It would therefore be desirable to provide an adaptor with an improved aerodynamic performance.

According to a first aspect of the present invention there is provided an adaptor for connecting a rotating electrical machine to a prime mover, the adaptor comprising an air outlet, wherein the adaptor is arranged to provide an increase in a cross-sectional area of air flow towards the air outlet.

The present invention may provide the advantage that, by arranging the adaptor so that it provides an increase in the cross-sectional area of the air flow towards the outlet, a progressive reduction in air velocity may be achieved within the adaptor towards the outlet. This may help to convert part of the dynamic pressure into additional static pressure rise through steady expansion of the air flow cross-section. This in turn may help to improve the overall amount of cooling air passing through the machine for a given fan input power.

The cross-sectional area of the airflow is preferably in a (notional) plane which is perpendicular to the direction of air flow.

The adaptor may comprise a wall associated with the or each outlet, which wall may direct air flow along an airflow path with an increasing cross sectional area. The wall may be, for example, part of a wall of the adaptor, such as a side wall, top wall or bottom wall. Alternatively, the wall may be part of a removable cover. In either case, the wall may function to gather airflow (for example, from a fan), and guide it towards the air outlet. This may help to reduce turbulence and/or energy loss in the airflow.

Preferably the wall functions as a partial volute. In general terms, a volute is a curved funnel that increases in cross-sectional area as it approaches the outlet. In an embodiment of the present invention, a wall of the adaptor, while not necessarily curved, may perform at least part of the function of a volute, by increasing the cross-sectional area of the air flow and thus reducing its speed. This may help to convert kinetic energy into pressure, leading to an increase in the aerodynamic performance of the adaptor.

The wall may also function to reduce re-entrainment of air back into the adaptor. This may help to improve fan performance, by preventing hot exhaust air from re-entering the adaptor.

The adaptor is preferably arranged to house a fan for drawing cooling air through the machine. The fan may be, for example, mounted on a shaft of the rotating electrical machine. In this case a path for the air flow may be defined by the perimeter of the fan on one side and a wall of the adaptor on the other side. Thus the increase in the cross-sectional area of the air flow may be achieved by virtue of an increasing distance between the perimeter of the fan and an inside surface of the wall in a direction of air flow towards an outlet.

The path for the air flow may be further defined by the front and rear of the adaptor, for example, a front member and a rear member which may be used to connect the adaptor to the prime mover and the rotating electrical machine, respectively.

Preferably the increase in the cross-sectional area of the air flow is progressive. This may help to ensure minimal turbulence and energy loss in the air flow.

Preferably the adaptor is non-cylindrical. This may help with structural rigidity, as well as allowing an increase in the cross-sectional area of the air flow to be achieved. For example in one embodiment the adaptor is substantially square-shaped in axial cross section. However other shapes are also possible, and the adaptor may be in the shape of any polygon such as a hexagon or octagon. In all cases each of the walls may be either flat or curved.

The adaptor may comprise a plurality of air outlets. In this case the adaptor may be arranged to provide an increase in a cross-sectional area of air flow towards each outlet. The air outlets are preferably spaced apart around the circumference of the adaptor. Thus, between each of the air outlets, there may be a section of wall without an air outlet. The section of wall may direct air flow to a subsequent air outlet.

In one embodiment four air outlets are provided. For example, when viewed axially, the adaptor may be notionally divided into four quadrants, and an air outlet may be provided in each of the four quadrants. However any other number of air outlets, such as 1, 2, 3, 5, 6 or some other number, may be provided instead.

The adaptor preferably comprises a front member for connection to the prime mover and a rear member for connection to the electrical machine. The adaptor may also include side walls, a top wall and a bottom wall. The side walls, a top wall and a bottom wall may connect the front member and the rear member, and may provide internal surfaces to direct air flow to a subsequent air outlet.

At least one of the side walls, top wall and bottom wall may be at an angle to a circumferential direction about the adaptor. For example, at least one of the side walls, top wall and bottom wall may be substantially tangential to a circumferential direction about the adaptor. This may allow the wall to provide a progressive increase in the cross-sectional area of the air flow towards an air outlet.

Preferably each of the walls is either flat, or curved with a radius of curvature which is greater than the radius of the adaptor. This may help to provide a progressive increase in the cross-sectional area of the air flow.

Preferably each of the walls has an air outlet. This may help to ensure that there are sufficient exit points for the air flow. The air outlet may be provided in a first part of the wall, in the direction of air flow. A second part of the wall (in the direction of air flow) may be without an air outlet or may have an air outlet which is blocked off. Thus the second part of the wall may confine air flow within the adaptor. The second part of the wall may direct air flow to an air outlet in a subsequent wall (in the direction of air flow). Preferably the second part of each of the walls functions as a partial volute and/or to reduce re-entrainment of air back into the adaptor.

The adaptor is preferably arranged to provide air paths for circulating air flow (that is, air flow which circulates in a generally circumferential direction inside the adaptor). The circulating air flow may be produced by a fan inside the adaptor.

In some embodiments of the invention, the air outlets which would have been provided in an existing adaptor design are blocked off in order to achieve at least some of the advantages mentioned above. However, the air outlets in an adaptor may also provide access for an operator to connect rotating parts of the prime mover and the electrical machine during assembly. If some of the air outlets are blocked off, then access may become more difficult.

In one embodiment of the invention, the adaptor further comprises one or more apertures to allow an operator access to rotating parts. In this case the adaptor may further comprise means for blocking the or each aperture. For example, a removable cover may be used to block off an aperture. The cover may be press fitted into the aperture and/or attached to the adaptor for example using bolts.

In at least some of the arrangements described above, the expelled air may be directed in various directions, such upwards and/or downwards as well as sideways. However in some setups, such as in some generating sets, it may be desirable for the expelled air to be directed in a different direction, for example, away from other parts of the generating set.

In one embodiment of the invention, the adaptor further comprises means for redirecting airflow from an air outlet. For example, the adaptor may further comprise a cowling which may be located on the outside of the adaptor. The cowling may direct airflow around at least part of the outside of the adaptor, such as around a top or bottom of the adaptor. Preferably the cowling is arranged to direct airflow which exits from the top or bottom of the adaptor towards a side of the adaptor. This may help to ensure that air is expelled away from other components.

In another embodiment of the invention the adaptor comprises an adaptor core and a removable cover. This may provide the advantage that a different cover can be provided to suit different customer requirements or operating environments. For example, the removable cover may be modified to suit different ingress protection ratings and/or to include different filtration components.

Preferable the removable cover defines the air outlet. Thus in operation air flow may pass from the adaptor core, through the removable cover, and through the air outlet defined by the removable cover.

Preferably the removable cover is arranged to provide an increase in a cross-sectional area of air flow towards the air outlet. Thus removable cover may be used to adjust the air flow pattern and thereby enhance the thermal performance of the machine.

Preferably the removable cover is arranged to fit over an aperture in the adaptor core. The aperture may be, for example, in the perimeter of the adaptor core, such that, in operation, air may flow radially outwards through the aperture. The aperture may be defined, for example, by a space between two cross members connecting a front member and a rear member of the adaptor core.

An advantage of this embodiment of the invention is that the cover can be removed during assembly to gain hand access to coupling disc fasteners through the aperture. This can facilitate assembly of the generator set. However when the cover is in place it may prevent access to moving parts without a tool. Thus this embodiment of the invention may facilitate assembly without compromising safety, while also allowing the air flow pattern to be adjusted, thereby enhancing thermal performance.

The adaptor may comprise a plurality of removable covers. Preferably the adaptor comprises a plurality of apertures, and a removable cover is provided for each aperture. For example, a separate removable cover could be provided for each aperture, or one cover could be provided for two or more apertures.

Preferably the adaptor core comprises a front member for connection to the prime mover, a rear member for connection to the electrical machine, and a plurality of cross members connecting the front member and the rear member. In this case an aperture may be defined by a space between the front member, the rear member, and two adjacent cross members.

In this embodiment of the invention the front member may comprise at least one area of reduced thickness. For example, the front member may comprise one or more slots on its inside surface. By area of reduced thickness it is preferably meant that the thickness of the material in that area is less than the thickness of the material in the surrounding area. This includes the case that the thickness is reduced to zero, i.e. there is a hole.

By providing areas of reduced thickness, the weight of the adaptor may be reduced, and less material may be needed for its manufacture. The size and depth of the areas of reduced thickness may be adjusted in order to achieve weight reduction while maintaining sufficient mechanical stiffness.

Similar areas of reduced thickness may also be provided with an adaptor in the other embodiments of the invention.

According to another aspect of the present invention there is provided an adaptor assembly comprising an adaptor in any of the forms described above, and a fan located inside the adaptor. The fan may be for mounting, for example, on the shaft of the rotating electrical machine. The fan may be arranged to produce a circulating air flow within the adaptor which exits the adaptor in a substantially tangential direction through the or each air outlet.

The adaptor assembly may further comprise a coupling plate for connecting a shaft of the electrical machine to the prime mover. The or each air outlet, and/or the or each aperture where provided, may allow an operator access to the coupling plate so that the coupling plate can be bolted to a part of the engine, such as a flywheel, during assembly.

According to another aspect of the present invention there is provided a rotating electrical machine including an adaptor or an adaptor assembly in any of the forms described above for connecting the machine to a prime mover.

According to another aspect of the present invention there is provided a method of cooling a rotating electrical machine, the rotating electrical machine including an adaptor for connecting the machine to a prime mover, the adaptor comprising at least one air outlet, the method comprising drawing air flow through the machine and out through the at least one air outlet, wherein a cross-sectional area of the air flow increases towards the or each air outlet.

Features of one aspect of the invention may be provided with any other aspect. Apparatus features may be provided with method aspects and vice versa.

As used herein, terms such as "axially", "radially" and "circumferentially" are preferably defined with reference to the axis of rotation of the electrical machine.

Preferred features of the present invention will now be described, purely by way of example, with reference to the accompanying drawings, in which.

Figure 1:
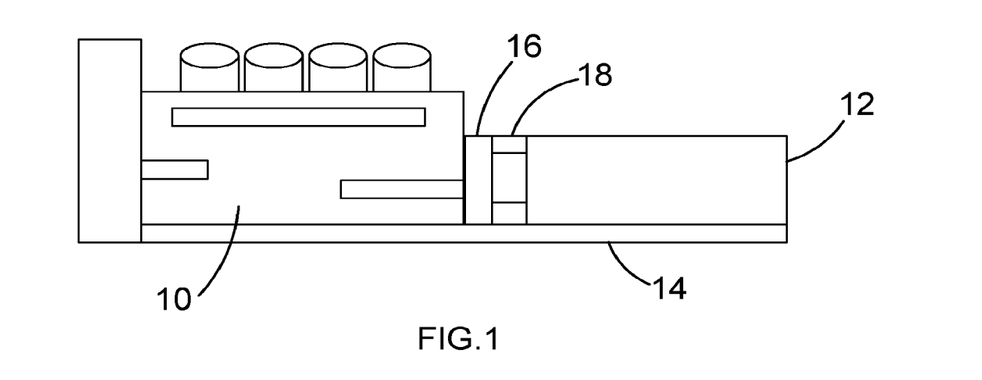
FIG. 1 shows schematically a generating set comprising an engine coupled to a generator.

FIG. 1 shows schematically a generating set comprising an engine 10 coupled to a generator (alternator) 12. The engine 10 is typically an internal combustion engine such as a petrol or diesel engine. The generator 12 may be any type of electrical generator, such as a synchronous generator or a permanent magnet generator. The engine 10 and generator 12 are both mounted on a bed frame 14. Rubber mounts may be provided between the engine and the bed frame, and between the generator and the bed frame. The crankshaft of the engine (not shown) is mechanically coupled to the rotor of the generator (not shown). In operation, mechanical energy produced by the engine 10 is transferred to the generator 12 in order to generate the electrical output.

In the arrangement of FIG. 1 the engine 10 comprises a flywheel located in a fly wheel housing 16. An adaptor 18 is used to connect the engine 10 to the generator 12. In FIG. 1 the adaptor is shown attached to the flywheel housing 16, although the adaptor may be attached to another part of the engine if designed. The adaptor 18 provides structural attachment between the generator housing and the engine, and thus helps to prevent relative movement between the engine and the generator.

Figure 2:
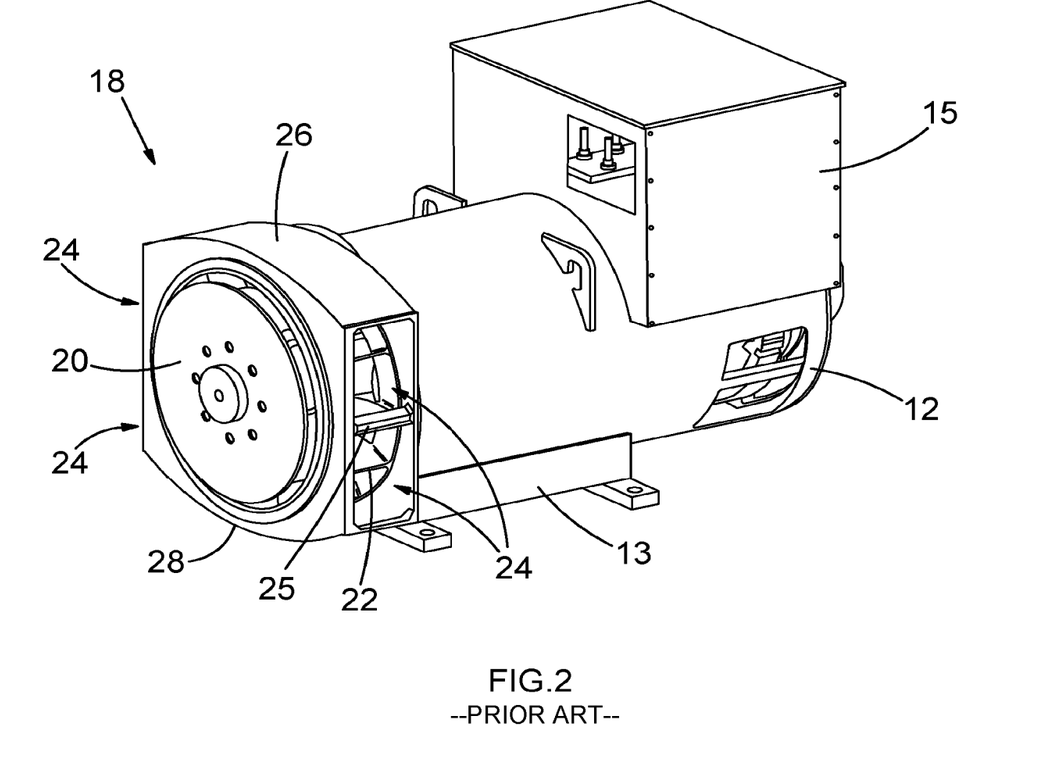
FIG. 2 shows parts of a previously considered generator design with an adaptor for connecting the generator to an engine.

FIG. 2 shows parts of a previously considered generator design with an adaptor for connecting the generator to an engine. Referring to FIG. 2, the generator 12 includes a generator foot 13 which is arranged to connect to the bed frame either directly or via a rubber mount. The generator also includes a terminal box 15 for electrical connections. The adaptor 18 is located at the drive end of the generator 12. A coupling plate 20 is used to mechanically couple the generator shaft to the engine's fly wheel. A fan 22 is located inside the adaptor 18 on the shaft, and is used to draw cooling air through the inside of the generator 12.

The adaptor 18 shown in FIG. 2 provides a number of functions, including structural attachment of the generator 12 to the engine housing, providing fan air outlets, allowing access in order to bolt the coupling plate 20 to the engine flywheel and to couple the adaptor to the flywheel housing, and limiting water ingress into the generator. These impose a number of conflicting requirements on the design.

Figure 3:
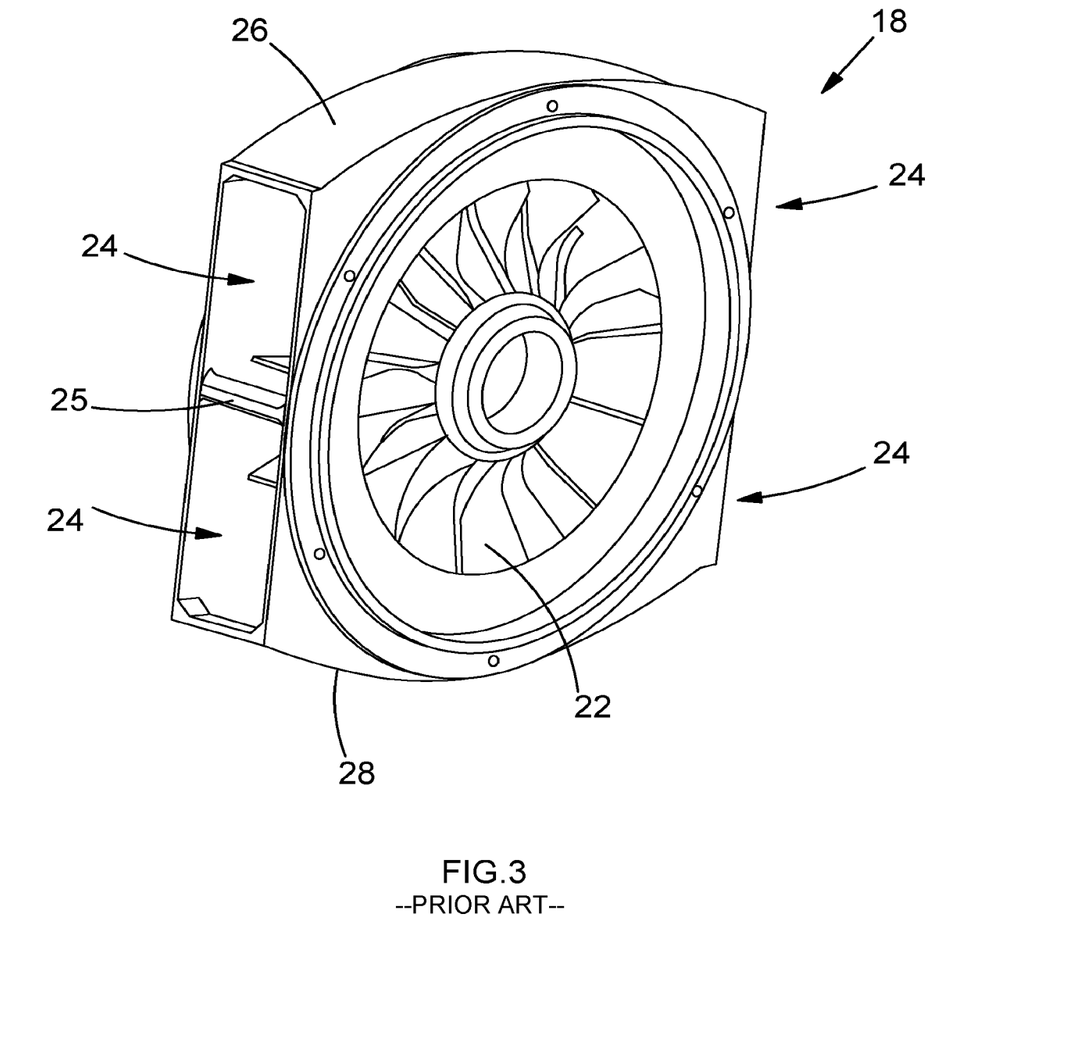
FIG. 3 shows parts of an adaptor assembly including the adaptor and fan of FIG. 2.

FIG. 3 shows parts of an adaptor assembly including the adaptor 18 and the fan 22 of FIG. 2. Referring to FIGS. 2 and 3, it can be seen that the adaptor 18 has a "square" design. In this design, rather than being cylindrical, the perimeter of the adaptor is elongated at each side, so that the axial cross-section of the adaptor approximates to a square. This "square" design helps to achieve the necessary structural rigidity and limits water ingress.

In the arrangement shown in FIGS. 2 and 3, the adaptor includes two adjacent air outlets 24 on each side. These air outlets are arranged symmetrically about a vertical plane passing through the axis of the machine. A top wall 26 and bottom wall 28 are provided, which have a radius of curvature which is greater than the radius of the adaptor. Thus the top wall and the bottom wall extend outwards in a sideways direction (that is, a horizontal direction perpendicular to the axis of the machine). The sides of the adaptor 18 are squared off to provide the air outlets 24. A bar 25 is provided between the two adjacent air outlets 24 on each side for mechanical strength. In addition to providing mechanical strength, the bar (and other geometry features of the adaptor) also provides mechanical stiffness.

The air outlets 24 are used to exhaust cooling air which has passed through the generator. The air outlets also allow an operator access to the coupling plate 20 so that it can be bolted to the engine flywheel. In addition, the air outlets allow access in order to couple the adaptor to the flywheel housing.

In practice it has been found that the aerodynamic performance of the square adaptor design shown in FIGS. 2 and 3 may be less than ideal. This may limit the cooling air-flow and increase the parasitic fan power.

Figure 4:
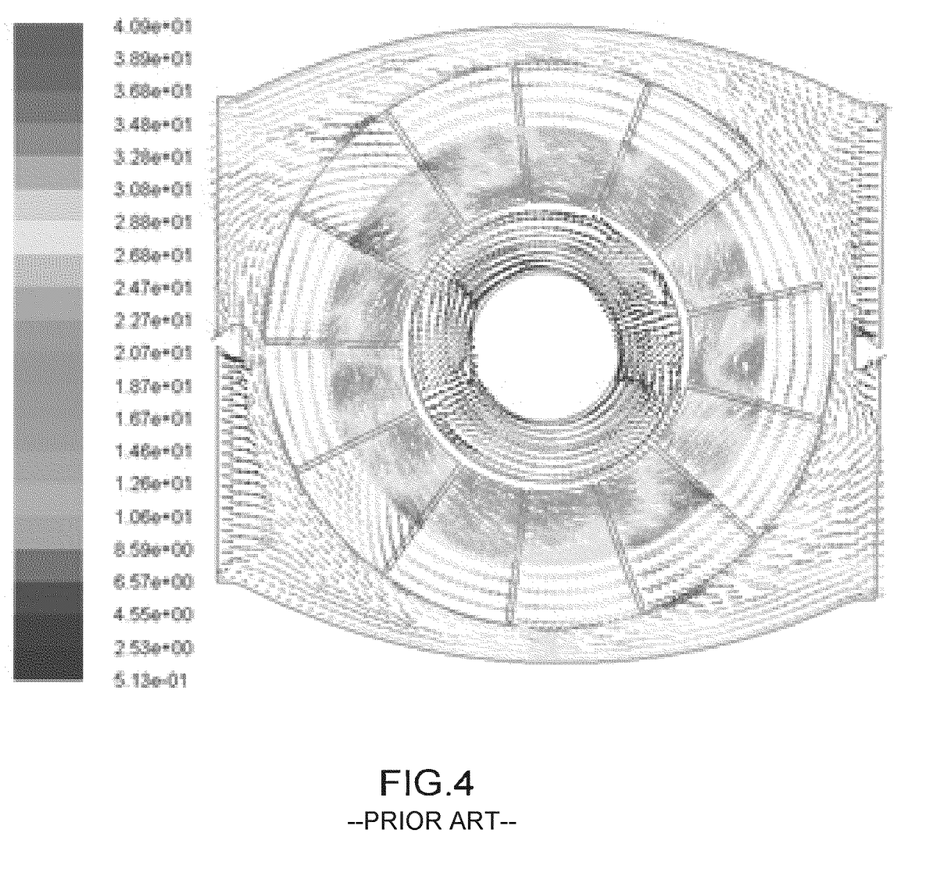
FIG. 4 shows air flow patterns within the adaptor of FIGS. 2 and 3.

FIG. 4 shows air flow patterns which have been found to exist inside the square adaptor of FIGS. 2 and 3. In the situation illustrated in FIG. 4, the fan is rotating in an anticlockwise direction, and the circulating airflow produced by the fan exits through the air outlets. One problem which has been identified is that reverse-flow may occur in some sections of the side air outlets. This may lead to re-entrainment of hot exhaust air back into the fan, as illustrated in FIG. 4. Another problem is that the shape of the adaptor may not provide the most efficient internal air flow paths for exhausting the circulating air flow.

Figure 5:
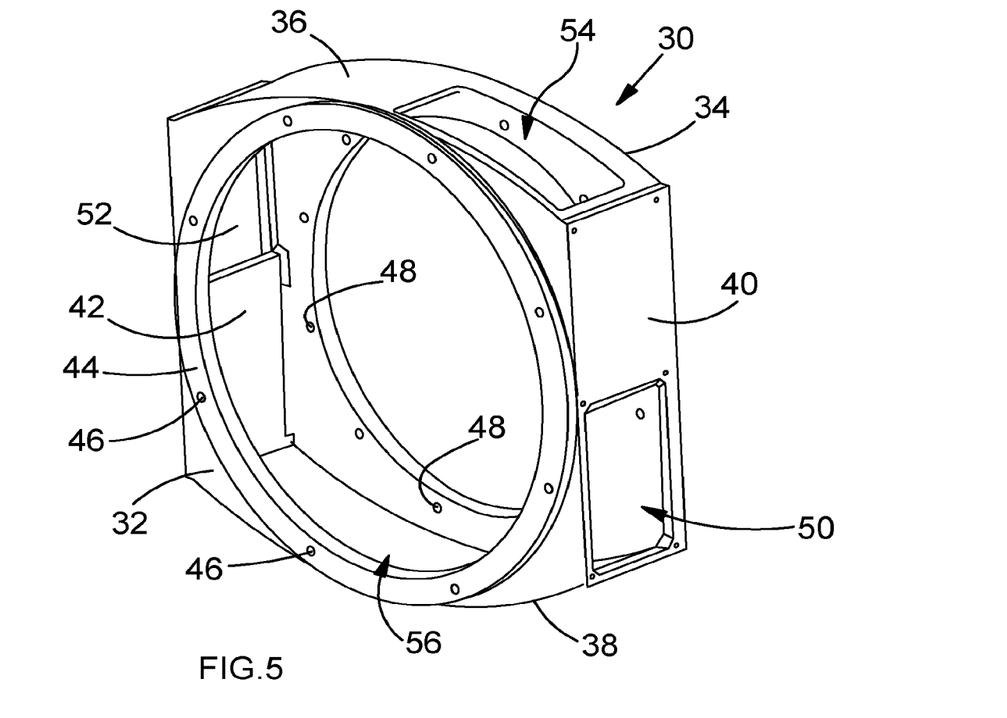
FIG. 5 shows an adaptor in accordance with one embodiment of the present invention.

FIG. 5 shows an adaptor 30 in accordance with one embodiment of the present invention. The overall shape of the adaptor in FIG. 5 corresponds generally to the square adaptor design shown in FIGS. 2 and 3. However, in the adaptor of FIG. 5, the downstream outlet on each side on each side of the adaptor (i.e. the second of the two adjacent outlets in the direction of air flow) is blocked off. A new outlet is provided in the top wall and the bottom wall of the adaptor respectively, immediately after the blocked-off outlet (again, in the direction of air flow). This results in an adaptor with four asymmetric air outlets, rather than the four symmetric outlets of FIGS. 2 and 3.

Referring to FIG. 5, the adaptor 30 of this embodiment comprises a rear member 32, a front member 34, a top wall 36, a bottom wall 38, and side walls 40, 42. The rear member 32 includes a circular mating face or spigot 44 with bolt holes 46 for bolting the adaptor to the frame of the generator. Similarly, the front member 34 comprises a mating face or spigot (not visible in FIG. 5) with bolt holes 48 for connecting the adaptor to the flywheel housing. The number and location of the bolt holes 46, 48 may be governed by standard requirements, such as SAE (Society of Automotive Engineers) standards, and may be varied in dependence on the particular engine and generator with which the adaptor is to be used.

In the arrangement of FIG. 5, the rear member 32 and the front member 34 are connected by means of the top wall 36, bottom wall 38, and side walls 40, 42. The square nature of the design helps to ensure structural rigidity.

Still referring to FIG. 5, it can be seen that each side wall 40, 42 has a single air outlet 50, 52. In each case, the air outlet 50, 52 is provided in the first part of the side wall, in the direction of air flow (the direction of rotation of the fan). Thus each air outlet is provided in the same location as the first of the two adjacent air outlets 24 shown in FIGS. 2 and 3. However, in the adaptor of FIG. 5, the second part of each side wall 40, 42 is blocked off, and thus confines air flow within the adaptor. Instead, a new air outlet 54 is provided in the first part (in the direction of air flow) of the top wall 36, and a new air outlet 56 is provided in the first part of the bottom wall 38. The second part of the top wall 36 and the second part of the bottom wall 38 remain blocked off.

Figure 6:
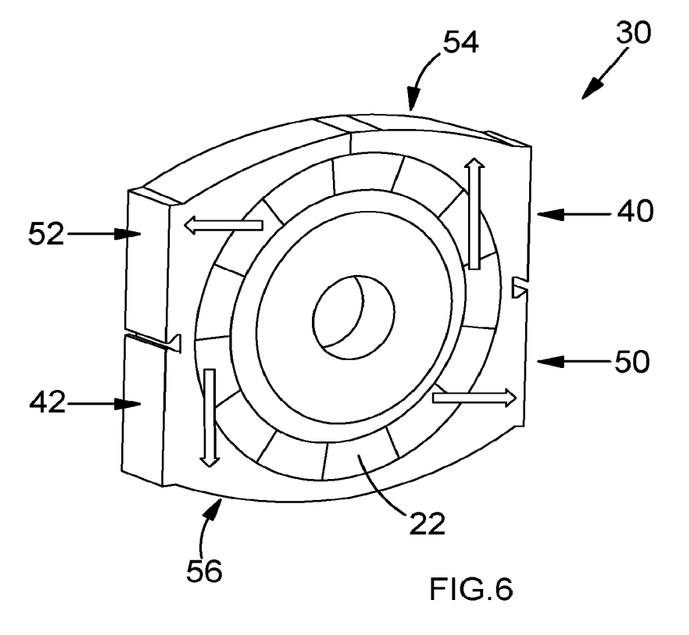
FIG. 6 shows exit paths for air flow in the adaptor of FIG. 5.

FIG. 6 shows schematically the exit paths for the air flow in the adaptor of FIG. 5. In FIG. 6, the fan 22 rotates in an anticlockwise direction, and thus produces a circulating air flow within the adaptor. The circulating air flow produced by the fan 22 exits the adaptor 30 in a substantially tangential direction through the air outlets 50, 52, 54, 56.

It has been found that the adaptor design shown in FIGS. 5 and 6 has a number of advantages over the previously considered adaptor of FIG. 2. Firstly, it has been found that, by blocking off the second of the two air outlets in each of the side walls, the re-entrainment of exhaust air back into the fan can be reduced, thereby improving fan performance.

However a further significant benefit is that the walls of the adaptor can function as a partial volute, increasing the cross-sectional area of the airflow from the fan towards the air outlets. It has been found that this can improve the performance of the fan, as explained below.

In the adaptor design of FIGS. 5 and 6, the fan acts as an impeller to transform the mechanical energy imparted by the rotating shaft into the air-flow as both kinetic energy (dynamic pressure) and potential energy (static pressure) increases. It has been found that, by blocking off the second of the two air outlets in each of the side walls 40, 42, the side walls can perform the following functions:

1. gather the air exiting the fan blades and guide it towards the air outlet in the top or bottom wall; and
2. provide a progressive reduction in air velocity with minimal turbulence and energy loss, and hence convert part of the dynamic pressure into additional static pressure rise through steady expansion of the air flow cross-section.

Thus the partial volutes created by the side walls 40, 42 provide two significant benefits: they increase the overall pressure rise created by the fan and improve the fan efficiency.

Similarly, the top wall 36 and bottom wall 38 act as partial volutes, guiding air flow towards the air outlets 50, 52, while providing a progressive reduction in air velocity through steady expansion of the air flow cross-section.

Figure 7:
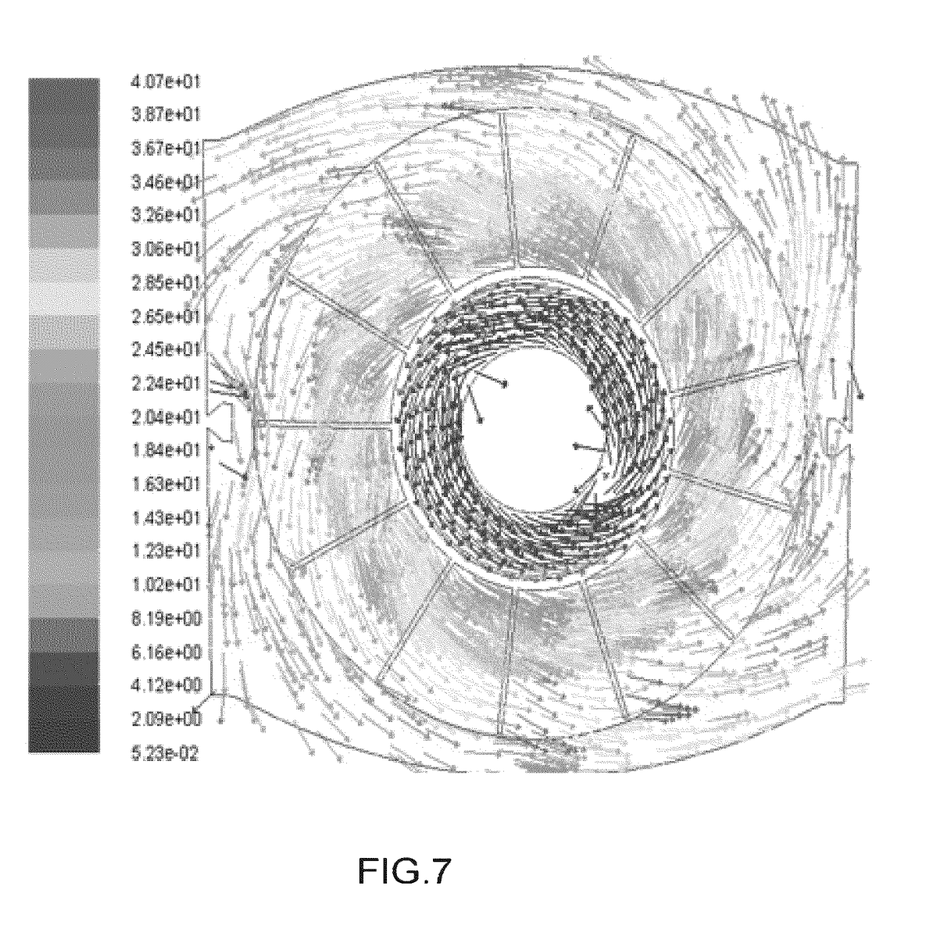
FIG. 7 shows air flow patterns within the adaptor of FIG. 5.

FIG. 7 illustrates air flow patterns within the adaptor 30 of FIGS. 5 and 6. Referring to FIG. 7 it can be seen that, in comparison to the situation in FIG. 4, the air flow is less turbulent, and there is little re-entrainment of hot exhaust air back into the fan. FIG. 7 also shows the progressive expansion of the air flow cross section towards the air outlets, giving a progressive reduction in air velocity and hence improving the performance of the fan.

Although in the adaptor shown in FIG. 5 the side walls 40, 42 are substantially flat, and the top wall 36 and the bottom wall 38 are curved, it would also be possible for the side walls to be curved and/or for the top and/or bottom walls to be flat. It would also be possible for any of the top wall, bottom wall and side walls to have two or more sections at an angle to each other. In practice any desired combination of curved and flat walls may be used.

As discussed above, in existing adaptor designs the air outlets also allow an operator to access rotating parts of the machine, such as a coupling plate, so that the rotating parts of the machine can be connected to the prime mover. Access is also required to connect the stationary housings (adaptor to flywheel housing). However it has been found that the adaptor design of FIG. 5 could potentially restrict the access which is available for these purposes.

Figure 8:
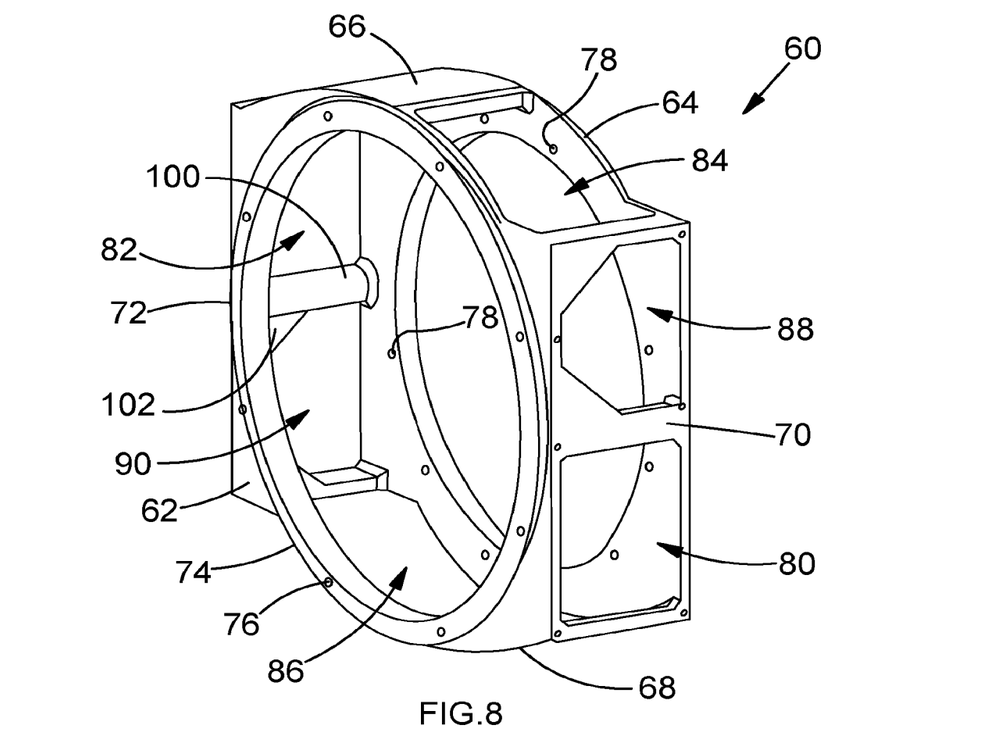
FIG. 8 shows an adaptor in another embodiment of the invention.

FIG. 8 shows an adaptor in another embodiment of the invention. Referring to FIG. 8, the adaptor 60 of this embodiment comprises rear member 62, front member 64, top wall 66, bottom wall 68, and side walls 70, 72. The rear member 62 includes a circular mating face or spigot 74 with bolt holes 76 for bolting the adaptor to the frame of the generator. Similarly, the front member 64 comprises a mating face or spigot (not visible in FIG. 8) with bolt holes 78 for connecting the adaptor to a flywheel housing. As in the adaptor of FIG. 5, in the adaptor 60 of FIG. 8, the rear member 62 and the front member 64 are connected by means of the top wall 66, bottom wall 68, and side walls 70, 72.

In the adaptor 60 of FIG. 8, the side walls 70, 72 each include an air outlet 80, 82. Each of these air outlets 80, 82 is provided in the first part of the side wall, in the direction of air flow (the direction of rotation of the fan). Air outlets 84, 86 are also provided in the first parts of the top wall 66 and the bottom wall 68, in a similar way to the adaptor of FIG. 5. However, in the adaptor 60 of FIG. 8 additional apertures 88, 90 are also provided in the second parts of the side walls 70, 72.

The additional apertures 88, 90 in the adaptor of FIG. 8 are provided in order to allow access to the coupling plate (see FIG. 2) so that the coupling plate can be bolted to the engine fly wheel during assembly of the generating set. The apertures also allow access in order to connect the stationary housings (adaptor to flywheel housing). The apertures 88, 90 are provided for access only, and are blocked off after assembly of the generating set. However, if desired, the apertures 88, 90 could be left open, although this may remove some of the advantages of the invention.

Figure 9:
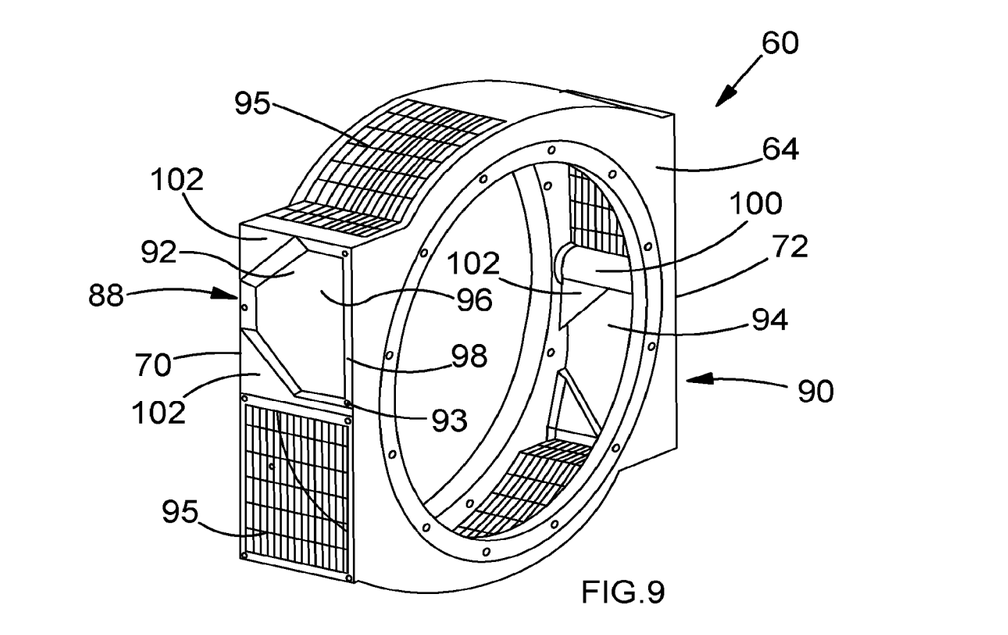
FIG. 9 shows the adaptor of FIG. 8 with the apertures blocked off.

FIG. 9 shows the adaptor 60 of FIG. 8 with the apertures 88, 90 blocked off. Referring to FIG. 9, the adaptor 60 includes solid covers 92, 94 which block off the apertures 88, 90. Each of the covers 92, 94 has a recessed part 96 with a shape which corresponds to and fits into the respective aperture 88, 90, and a lip 98 which engages with the outside surface of the wall 70, 72. The solid covers can be removed to allow access to the coupling plate, and then put back in place once the generating set has been assembled. The solid covers may be arranged to fit into the apertures 88, 90 with a press fit, and/or may be attached to the adaptor 60 with bolts 93. When in place, the solid covers 92, 94 are substantially air tight.

Although the covers 92, 94 shown in FIG. 9 have a recessed part, it would also be possible to use plane (flat) covers with no recess, or covers having another shape, if this does not affect air flow/temperature rise significantly.

FIG. 9 also shows grills 95 which can be placed over the air outlets 80, 82, 84, 86. The grills 95 allow air to exit while helping to prevent entry of foreign bodies into the adaptor.

In the adaptor 60 of FIGS. 8 and 9, additional material may be added in specific locations to increase the structural strength and counteract the impact of the additional apertures. Referring to FIGS. 8 and 9, cross ribs 100 are provided inside the side walls 70, 72 for additional strength. In addition, strengthening webs 102 are provided in the side walls 70, 72. In addition to strength, these features provide additional stiffness/rigidity.

In some generating sets it is possible that, with the adaptor designs described above, the vertical air-flow from the additional top and bottom air-outlets may interact with other components, such as the engine air inlet, the base frame or the engine oil sump.

Figure 10:
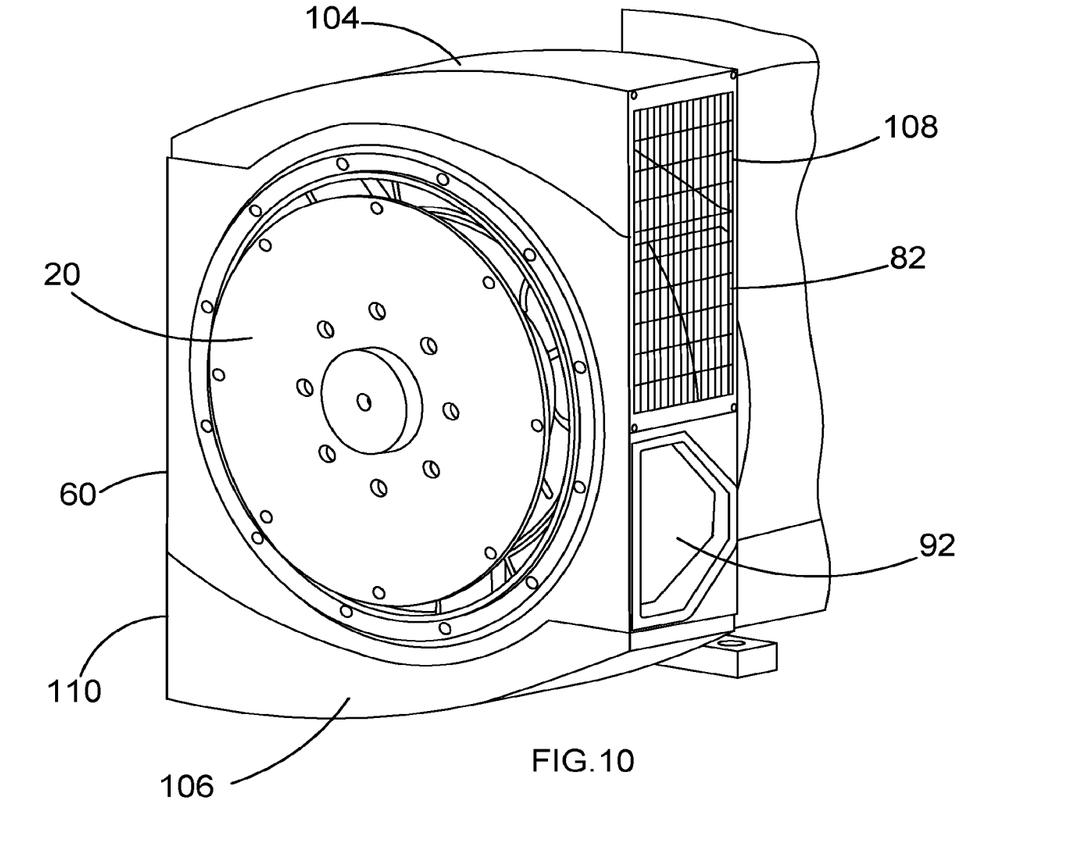
FIG. 10 shows an adaptor design in another embodiment of the invention.

FIG. 10 shows an adaptor design in another embodiment of the invention. In the arrangement of FIG. 10 the adaptor design is substantially the same as that shown in FIGS. 8 and 9. However, in the arrangement of FIG. 10, cowlings 104, 106 are provided on the top and bottom of the adaptor 60 respectively. The cowling 104 takes air flow from the air outlet 84 at the top of the adaptor 60, and guides the air flow around the top of the adaptor and to an additional side outlet 108 at the top of the adaptor. Similarly the cowling 106 takes air flow from the air outlet 86 at the bottom of the adaptor, and guides the air flow around the bottom of the adaptor and to an additional side outlet 110 at the bottom of the adaptor. Thus the cowlings 104, 106 allow air to exit from the side of the adaptor in a horizontal direction. This may help to prevent the airflow from interacting with other components.

Figure 11:
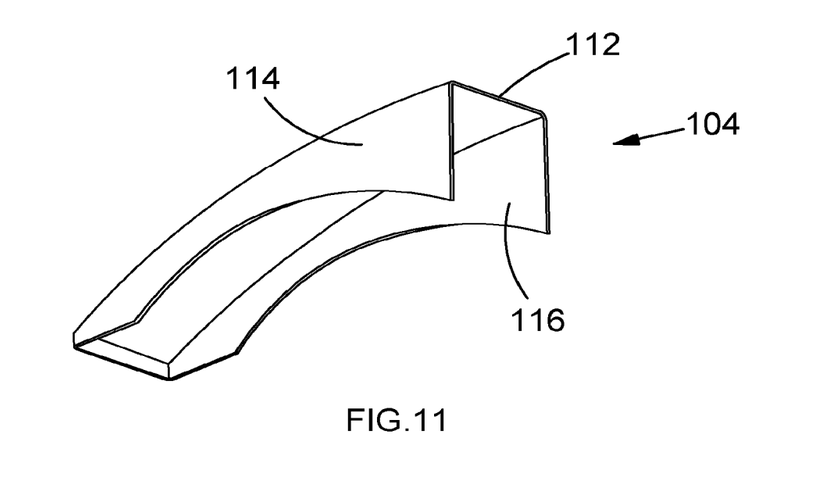
FIG. 11 shows the cowling of FIG. 10 in more detail.

FIG. 11 shows the cowling 104 in more detail. Referring to FIG. 11, the cowling 104 includes a curved top wall 112, and side walls 114, 116. The side walls are designed to fit to the top wall of the adaptor 60. The cowling 104 may provide a progressive expansion of the air flow cross section towards the air outlet, thereby giving a progressive reduction in air velocity and further improving the performance of the fan. The cowling 106 of FIG. 10 has a similar shape to the cowling 104.

In practice, the shape of the cowlings may be adapted to fit within the physical constraints of the generating set. Thus the top and bottom cowlings may have a different shape, or a single cowling may be used at either the top or bottom of the adaptor. The cowlings may be arranged to guide airflow to either side of the adaptor.

In any of the above embodiments the adaptor 30, 60 may be formed from a single piece of metal, and may be cast and/or machined in order to achieve the final adaptor shape, or the adaptor may be fabricated. The cowlings 104, 106 and the covers 92, 94 may be formed from metal, or heat resistant plastic. However in all cases any other suitable materials may be used instead.

Tests carried out by the present applicant have found that, in one arrangement, an adaptor designed in accordance with the principles described above may provide a 15% increase in air flow rate in comparison to a previous adaptor design. This results in better cooling of the generator, leading to better power density. In tests, it has been found that an approximately 8° C. reduction in the temperature of the machine may be achieved in some circumstances.

FIGS. 12 to 16 show parts of an adaptor design in accordance with another embodiment of the invention. In the arrangement of FIGS. 12 to 16, an adaptor core is provided which is essentially cylindrical in shape. However removable covers are also provided in order to modify the air flow pattern. The adaptor design of FIGS. 12 to 16 is designed to fulfil mechanical and thermal requirements while keeping consistent or improving hand access to the coupling disc fasteners.

Figure 12:
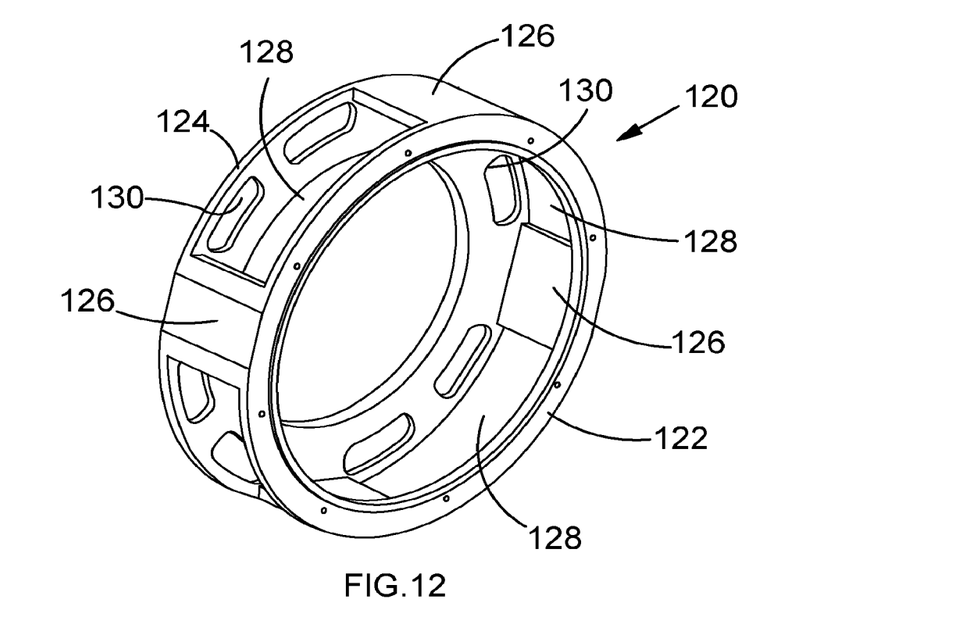
FIGS. 12 to 16 show parts of an adaptor design in accordance with another embodiment of the invention.

Referring to FIG. 12, the adaptor core 120 of this embodiment comprises a rear member 122, a front member 124, and cross members 126. Four cross members 126 are provided, spaced at regular intervals around the adaptor. The cross members 126 define apertures 128. Thus in this embodiment four apertures 128 are provided, spaced regularly around the adaptor core.

In the arrangement of FIG. 12 the rear member 122 includes a circular mating face with bolt holes for bolting the adaptor to the frame of the generator. Similarly, the front member 124 comprises a mating face with bolt holes for connecting the adaptor to a flywheel housing. The number and location of the bolt holes may be governed by standard requirements, such as SAE standards, and may be varied in dependence on the particular engine and generator with which the adaptor is to be used.

Still referring to FIG. 12, it can be seen that slots 130 are provided on the inside of the front member 124. The slots are areas of reduced thickness, and are designed to reduce the weight of the adaptor. The size and depth of the slots are adjusted in order to achieve weight reduction while maintaining sufficient mechanical stiffness for various SAE sizes. Although in FIG. 12 the slots are shown as areas of reduced thickness, in some embodiments all material may be removed in these areas.

The adaptor core 120 of FIG. 12 may be made from SG (spheroidal graphite) iron, although other suitable materials may be used instead. The adaptor core may be made by casting and/or machining, or any other suitable technique.

The primary function of the adaptor core 120 is to provide a mating connection face between the generator frame and the engine flywheel housing. The adaptor core is therefore designed to provide a robust connection between the generator and the engine. The four apertures 128 on the sides give improved hand access to reach the coupling disc fasteners. This makes the adaptor easier to assemble and service. The adaptor is designed in such a way that it is lighter and stiffer with slots in the back face of the casting (engine side) to make it lighter.

Figure 13:
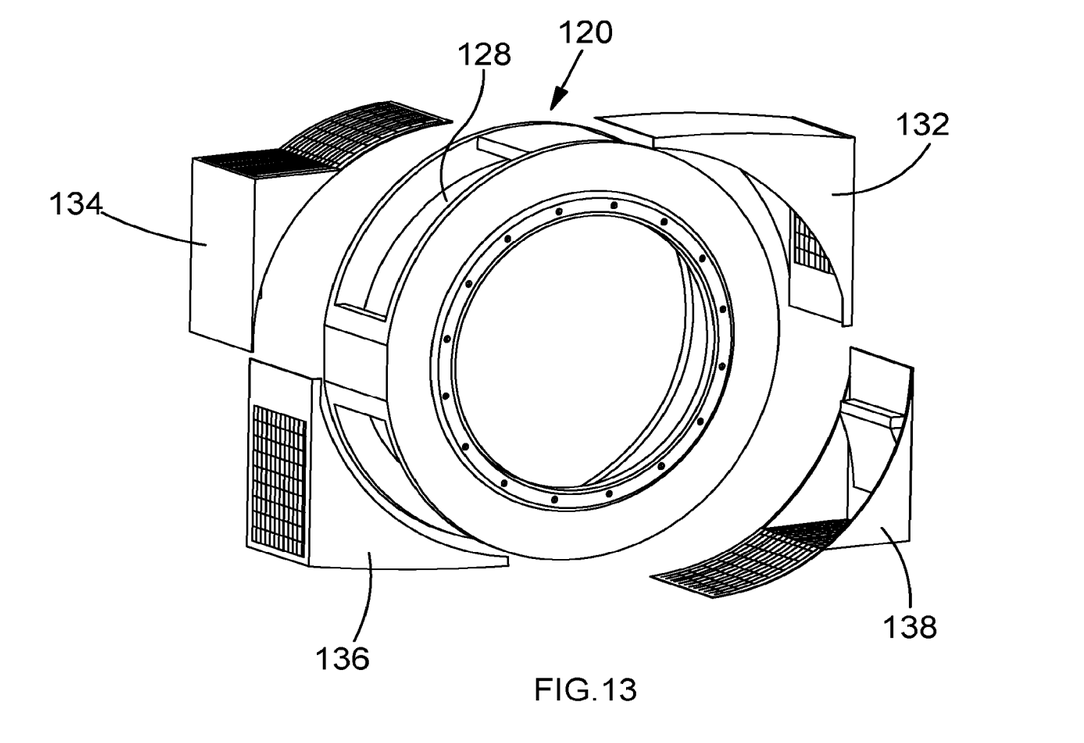

FIG. 13 illustrates how removable covers may be added to the adaptor core of FIG. 12. Referring to FIG. 13, a separate cover 132, 134, 136, 138 is provided for each of the apertures 128. The covers fit around the outside of the adaptor core, and are used to adjust the air flow pattern.

Figure 14:
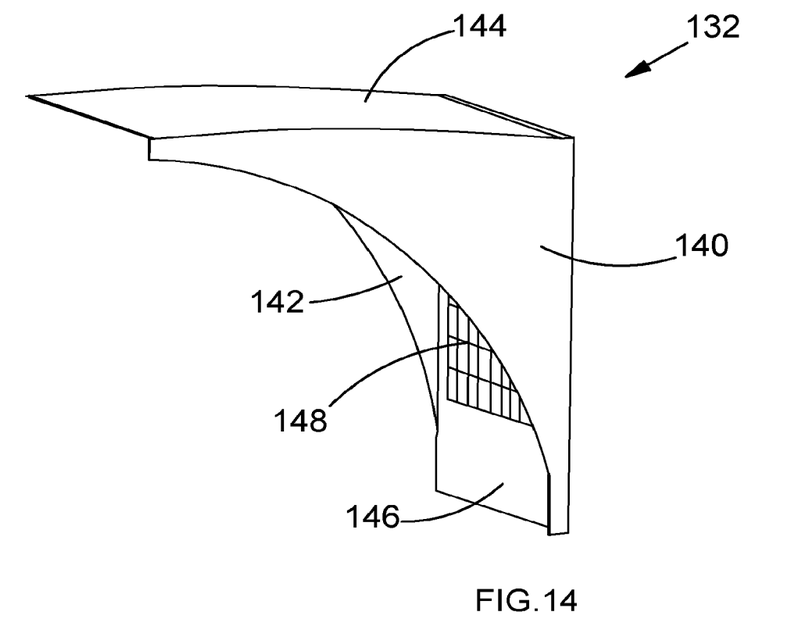

FIG. 14 shows the cover 132 in more detail. Referring to FIG. 14, the cover 132 comprises a rear wall 140, a front wall 142, a top wall 144, and a side wall 146. The rear wall 140 and front wall 142 extend radially outwards from the adaptor core in substantially the same planes as the rear member 122 and front member 124, respectively. Thus the rear wall 140 and front wall 142 constrain airflow beyond the periphery of the adaptor. The top wall 144 is substantially tangential to the adaptor core, and blocks off air flow. The side wall 146 is substantially tangential to the adaptor core and substantially perpendicular to the first wall, and defines an air outlet. A grill 148 is provided in the air outlet for ingress protection and to improve strength and rigidity.

Figure 15:
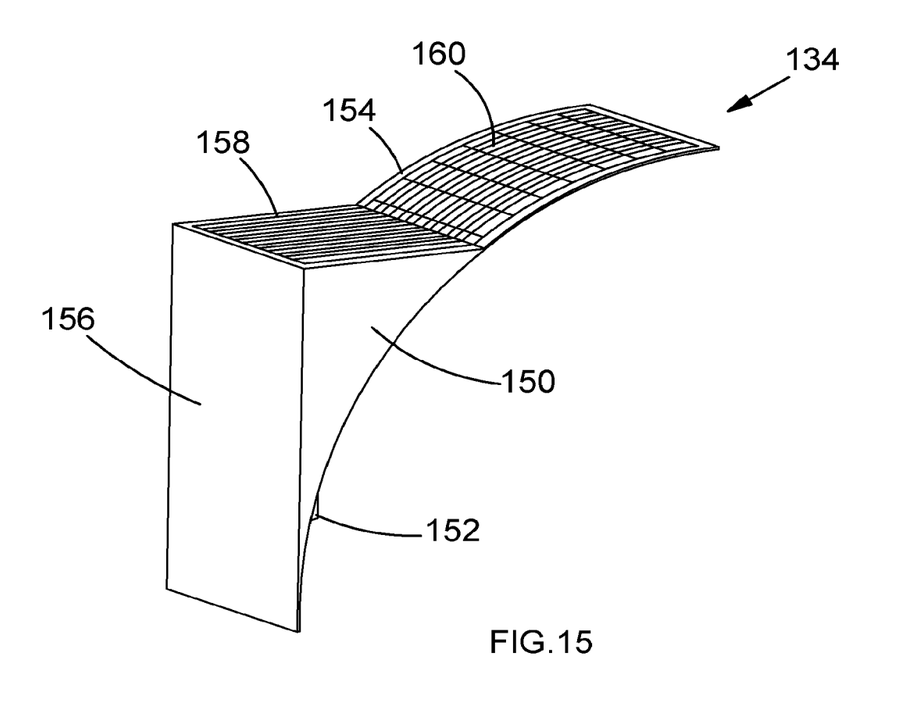

FIG. 15 shows the cover 134 in more detail. Referring to FIG. 15, the cover 134 comprises a rear wall 150, a front wall 152, a top wall 154, and a side wall 156. The rear wall 150 and front wall 152 extend radially outwards from the adaptor core in substantially the same planes as the rear member 122 and front member 124, respectively. Thus the rear wall 150 and front wall 152 constrain airflow beyond the periphery of the adaptor. The side wall 156 is substantially tangential to the adaptor core, and blocks off air flow. The top wall 154 is divided into two parts 158, 160. The first part 158 is substantially flat, and substantially perpendicular to the side wall 156. However the second part 160 is curved, and conforms substantially to the shape of the outside of the adaptor core. The first part 158 and second part 160 of the top wall 154 together define an air outlet. A grill is provided in the air outlet for ingress protection and to improve strength and rigidity.

The covers 136 and 138 shown in FIG. 13 have substantially the same shapes as the covers 132, 134, respectively. The covers may be made from any suitable material, such as sheet steel.

Figure 16:
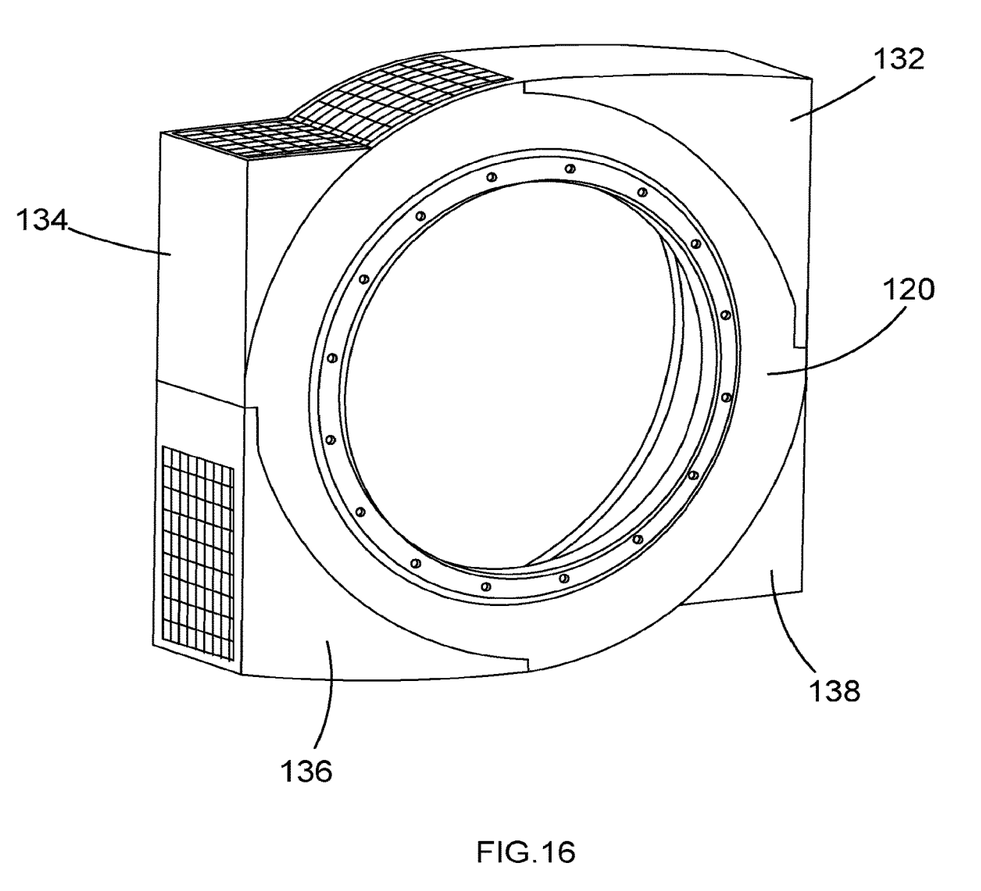

FIG. 16 shows the adaptor with the covers 132, 134, 136, 138 in place. The removable covers fit to the outside of the adaptor core 120 to give it an overall "square" shaped design similar to that of the adaptor of FIGS. 5 and 8.

Referring to FIG. 16, it can be seen that, when the covers 132, 134, 136, 138 are fitted to the adaptor core 120, they define a top wall, a bottom wall, and side walls. The first part of each of these walls is blocked off, while the second part of each of the walls has an air outlet. As a consequence, the air flows in the adaptor are similar to those shown in FIGS. 6 and 7.

In the arrangement of FIGS. 12 to 16, the internal profile of the adaptor core 120 and the covers 132, 134, 136, 138 is designed to provide a volute effect to the airflow. This improves the airflow performance, in comparison to previously considered adaptor designs. Thus the thermal performance of the generator can be improved.

An advantage of the removable covers in the adaptor of FIGS. 12 to 16 is that they can be modified to suit different ingress protection ratings. This can provide the flexibility to cater for different customer requirements and operating environments. Various different removable covers can be manufactured to provide various degrees of ingress protection, without the need to manufacture a different adaptor for each situation.

Another advantage of the removable covers is that they can be removed during assembly to gain hand access to coupling disc fasteners. This can facilitate assembly of the generator set. However when the covers are in place they prevent the operator from gaining access to moving parts without a tool, thereby complying with operating regulations.

In addition, the removable covers can be used to adjust the air flow pattern thus enhancing the thermal performance.

Furthermore, the removable covers may include various different filtration components which may be adapted to suit different customer requirements and operating environments.

It will be appreciated that embodiments of the present invention have been described by way of example only, and modifications in detail will be apparent to the skilled person. For example, features of one embodiment may be provided with any other embodiment. Although embodiments of the invention have been described with reference to a generating set, the present invention may be used with any type of system where it is desired to connect a prime mover to a rotating electrical machine.

The invention claimed is:

1. An adaptor arranged to connect a rotating electrical machine to a prime mover, the adaptor comprising:
a plurality of side walls;
a top wall; and
a bottom wall, wherein
each of the plurality of side walls, the top wall, and the bottom wall includes an air outlet,
each air outlet is provided in a first part of the corresponding wall, in a direction of air flow,
a second part of at least one of the plurality of side walls, the top wall, and the bottom wall has an aperture which is blocked off using a removable cover;
the removable cover is removable to allow an operator access to rotating parts;
the removable cover is arranged to direct air flow to the air outlet in a subsequent wall in the direction of the airflow, and
the removable cover is arranged so as to increase a cross-sectional area of air flow towards the air outlet of the subsequent wall in the direction of the airflow.

2. An adaptor according to claim 1, wherein each of the walls functions as a partial volute.

3. An adaptor according to claim 1, wherein each of the walls is arranged to reduce re-entrainment of air back into the adaptor.

4. An adaptor according to claim 1, wherein the adaptor is arranged to house a fan.

5. An adaptor according to claim 4, wherein the increase in the cross-sectional area of the air flow is achieved by increasing distance between a perimeter of the fan and a wall of the adaptor.

6. An adaptor according to claim 1, wherein the increase in the cross-sectional area of the air flow is progressive.

7. An adaptor according to claim 1, wherein the adaptor is substantially square-shaped in axial cross section.

8. An adaptor according to claim 1, wherein the adaptor is arranged to provide an increase in a cross-sectional area of air flow towards each air outlet.

9. An adaptor according to claim 8, wherein the air outlets are spaced apart around the circumference of the adaptor.

10. An adaptor according to claim 9, wherein the adaptor has four quadrants and an air outlet is provided in each of the four quadrants.

11. An adaptor according to claim 1, further comprising a front member arranged to connect the adaptor to the prime mover and a rear member arranged to connect the adaptor to the electrical machine.

12. An adaptor according to claim 11, wherein at least one of the walls is connected between the front member and the rear member, wherein the at least one of the walls is arranged to direct air flow along an airflow path with an increasing cross-sectional area.

13. A rotating electrical machine comprising:
   an adaptor arranged to connect the rotating electrical machine to a prime mover and including
      a plurality of side walls,
      a top wall, and
      a bottom wall, wherein:
         each of the plurality of side walls, the top wall, and the bottom wall includes a first part defining an air outlet in a direction of air flow,
         at least one of the plurality of side walls, the top wall, and the bottom wall includes a second part having an aperture which is blocked off using a removable cover;
         the removable cover is removable to allow an operator access to rotating parts;
         the removable cover is arranged to direct air flow to the air outlet in a subsequent wall in the direction of the airflow, and
         the removable cover is arranged to provide an increase in a cross-sectional area of air flow towards the air outlet of the subsequent wall in the direction of the airflow; and
   a fan arranged to draw air though the rotating electrical machine, wherein the fan is housed in the adaptor.

14. The rotating electrical machine of claim 13, wherein the increase in the cross-sectional area of the air flow is achieved by increasing distance between a perimeter of the fan and a wall of the adaptor.

15. The rotating electrical machine of claim 13, wherein the increase in the cross-sectional area of the air flow is progressive.

16. The rotating electrical machine of claim 13, wherein the adaptor is substantially square-shaped in axial cross section.

17. The rotating electrical machine of claim 13, further comprising a front member arranged to connect the adaptor to the prime mover and a rear member arranged to connect the adaptor to the rotating electrical machine.

18. A method of cooling a rotating electrical machine, the rotating electrical machine including an adaptor which connects the rotating electrical machine to a prime mover, the adaptor comprising
   a plurality of side walls;
   a top wall; and
   a bottom wall, wherein
      each of the plurality of side walls, the top wall, and the bottom wall includes an air outlet,
      each air outlet is provided in a first part of the corresponding wall, in a direction of air flow,
      at least one of the plurality of side walls, the top wall, and the bottom wall includes a second part having an aperture which is blocked off using a removable cover;
      the removable cover is removable to allow an operator access to rotating parts;
      the removable cover is arranged to direct air flow to the air outlet in a subsequent wall in the direction of the airflow, and
      the removable cover is arranged to provide an increase in a cross-sectional area of air flow towards the air outlet of the subsequent wall in the direction of the airflow,
   the method comprising:
      drawing air flow through the rotating electrical machine, and drawing air flow out through the air outlets.

19. The method of claim 18, wherein drawing air flow through the rotating electrical machine and out through the air outlets includes directing air to the air outlets across the at least one removable cover.

20. The method of claim 18, wherein the increase in the cross-sectional area of the air flow is progressive.

* * * * *